UNITED STATES PATENT OFFICE.

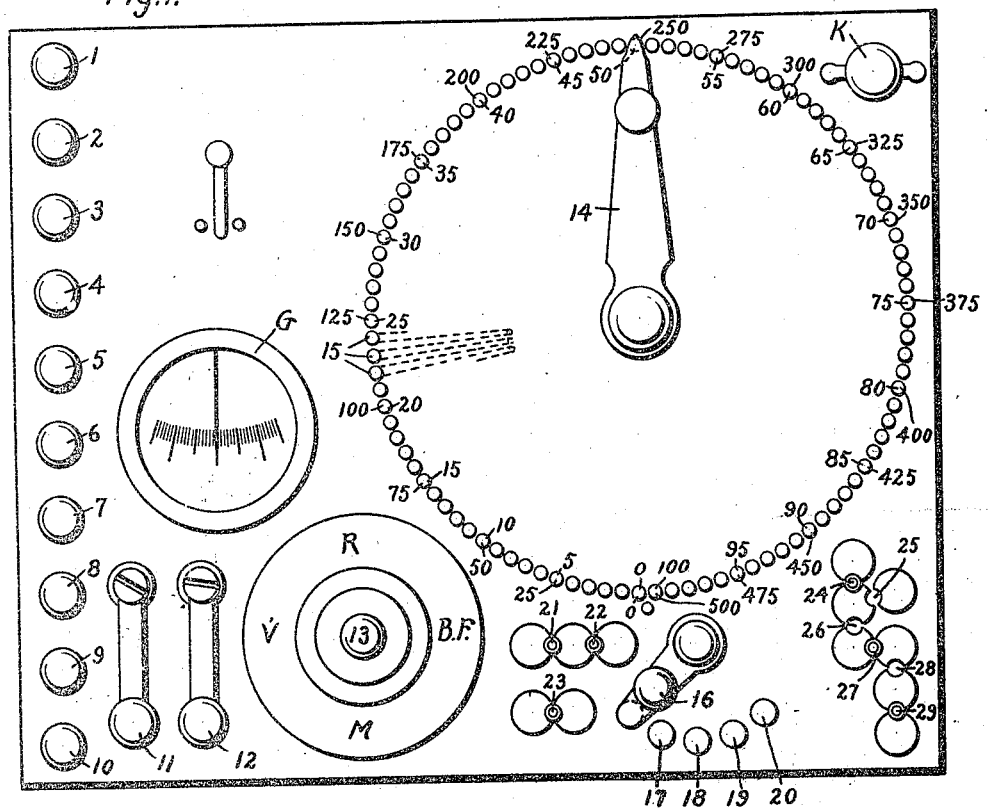
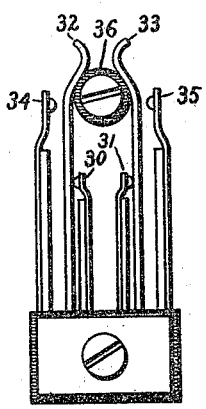

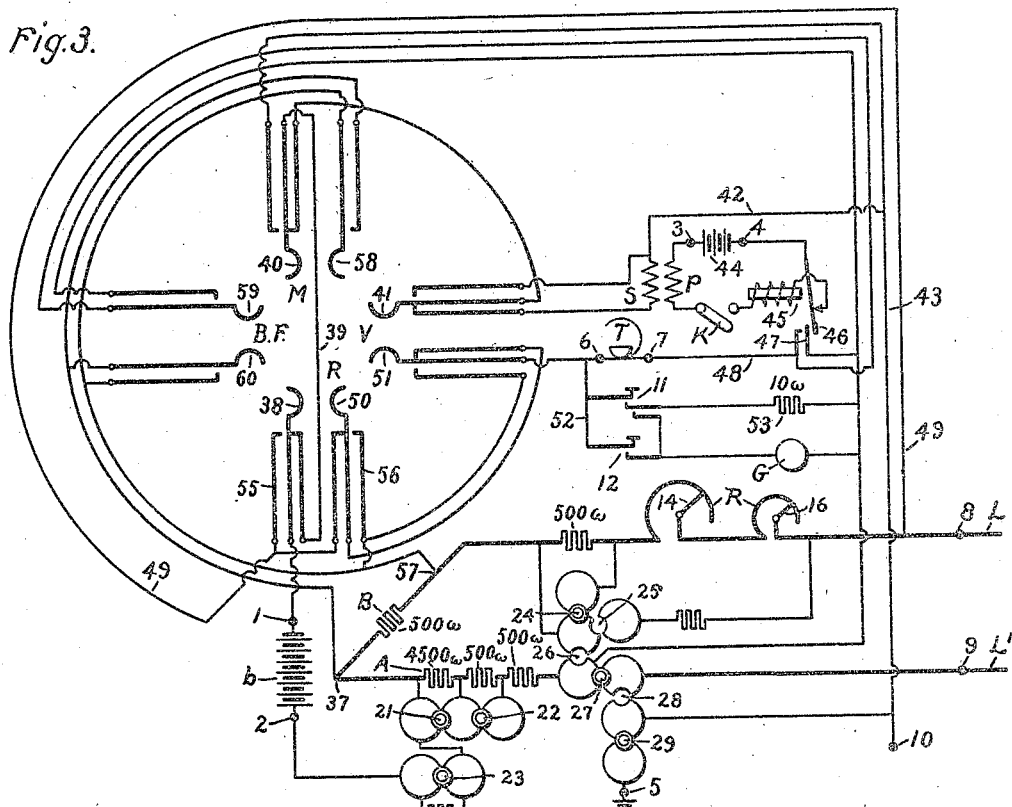

CHARLES A. HOXIE, OF SCHENECTADY, NEW YORK.

TESTING SET.

952,741. Specification of Letters Patent. Patented Mar. 22, 1910.

Application filed April 19, 1909. Serial No. 490,957.

*To all whom it may concern:*

Be it known that I, CHARLES A. HOXIE, a citizen of the United States, residing at Schenectady, county of Schenectady, State of New York, have invented certain new and useful Improvements in Testing Sets, of which the following is a specification.

My present invention comprises an electrical testing set suitable for making measurements and tests on telephone and telegraph lines.

In the practical operation of a telephone system, particularly when operating over long distances, occasions arise for making tests of various kinds, such as the measurement of the resistance of a line, or the location of a "ground" or "cross", or the measurement of insulation resistances from one line to another, or from line to ground, etc. As the result of this necessity, there has grown up a series of standard tests well known to most wire chiefs, and fully described and explained in text books on electrical testing. As thus described, a considerable variety of apparatus is necessary for making the several tests, and considerable skill is required in connecting up the apparatus and in making the readings, and also in reducing those readings to useful form.

By the present invention all the elements necessary for the more common tests have been combined in a single apparatus and have there been arranged in such manner that by very simple adjustment of certain keys and plugs, all ordinary telephone measurements can be made. Furthermore, the readings are obtainable in terms which require little mathematical calculation to reduce them to their ultimate form.

According to my present invention, all the necessary elements, such as resistances, batteries, current detectors, and the like, are grouped about a master key, and are so arranged with relation to one another and to that master key, that for making the four most important tests, namely, resistance measurements, Varley loop test, Murray loop test, and break-finder test, the preliminary adjustments of the apparatus comprise nothing more than throwing the master key into one of its four different positions. The test can then be completed by varying the value of the adjustable resistance until the galvanometer or other current detector of the system shows a balanced condition. The simplicity of the preliminary adjustment obviates the necessity for expert electrical knowledge in making these four basic measurements, and makes it possible to have a large part of the routine testing of a telephone exchange done by switchboard boys or ordinary wiremen.

The apparatus described herein also embodies improvements in certain of the elements, as for instance, the adjustable resistance and the current detecting means. But from a broad standpoint, my invention appears to reside more particularly in the grouping and correlation of the several elements whereby the great flexibility and adaptability of the apparatus for its many different uses is assured.

In the drawings accompanying and forming a part of this specification, Figure 1 shows the top of the box in which many elements of the set are permanently mounted; Fig. 2 is a detail of the master key; Fig. 3 is a diagram of the various circuits, and Figs. 4 to 12 inclusive, are diagrams illustrative of various results produced by shifting the connections of the set.

Throughout the several figures like reference characters have been used to designate the several elements.

In connecting up the apparatus shown in Fig. 1, I connect a twenty-four volt battery to terminals 1 and 2, and a five volt battery to terminals 3 and 4. Terminal 5 is connected to ground, and terminals 6 and 7, are connected to a telephone receiver. Terminals 8 and 9 furnish means for connecting the set to the line wires to be measured or tested. This connection is ordinarily made, as occasion may require, through the regular switchboard of the exchange. All the other connections can be of a permanent nature and made at the time the set is installed. Terminal 10 is used only for a test of unusual character involving the connecting-in of a third line wire. Among other elements appearing in Fig. 1, is a galvanometer G of ordinary type controlled in a manner hereinafter described by keys 11 and 12. The main or master key of the set is located just to the right of these galvanometer keys and has a handle 13 which can be thrown into any one of four different positions. By throwing the handle to the right toward the marks B. F. the testing set is put in adjustment for the break-finder test; by throwing it to the left toward V the Varley loop test may be made; by throwing it down toward M the apparatus is adjusted for the Murray loop test; and when the handle is up, at R, resistance measurements may be made. This is the sole change necessary to put the testing set in complete adjustment for making any one of these four different measurements. Also, in Fig. 1, is shown a pivotally mounted contact arm 14. This is movable about a dial carrying studs 15 between each pair of which is a loop or coil of resistance wire. There are 100 of these loops, each having a resistance of five ohms, and all of them taken together making up the adjustable resistance of the testing set with a maximum resistance of 500 ohms. The movable contact arm 14 is the means whereby the effective value of this resistance may be varied. For making resistance variations of less than one whole loop or coil, there is provided a second contact arm 16 movable over studs 17, 18, 19 and 20 to introduce successively four one ohm coils as part of the adjustable resistance. For many tests these more accurate adjustments are unnecessary. Also, in Fig. 1, there are shown plugs 21, 22 and 23, and at the right of arm 16, plug 24, sockets 25 and 26, plug 27, socket 28 and plug 29. Each of these plugs and sockets has certain functions, but these can best be considered in connection with the diagram constituting Fig. 3 in which these plugs and sockets again appear.

Fig. 3 shows the apparatus in its inactive or normal setting, Fig. 4 is a key or index to the relation of the more important elements of Fig. 3. The master key is shown as comprising four sets of spring clips designated respectively, R, V, M, and B. F. Each set of clips is of the general type shown in Fig. 2 as comprising inner contacts 30 and 31, movable contactors 32 and 33, and outer contacts 34 and 35. When the switch is thrown, an insulating sleeve 36 is forced upward between the movable contactors, spreading them apart and thereby opening the circuit to the inner contacts and establishing connection with the outer ones.

Referring again to Figs. 3 and 4, it will be seen that the line wire L coming in from the right by way of binding post 8 finds a path through the adjustable resistance R, around by way of resistance B, which constitutes one of the ratio arms of the set, to the junction point 37 and then back to the right by way of resistance A, which is the other ratio arm, and finally, out through binding post 9 to the other line L'. It may be here noted that resistance A is in three sections, one of 500 ohms to be used in all tests, and another of 500 ohms and one of 4500 ohms, which can be put into service, by pulling plugs 22 and 21 respectively, when the particular work in hand requires a multiplying factor in this A arm of the bridge. The power battery b is in connection with junction point 37 by way of plug 23, and has its other terminal grounded by way of contactor 38, cross connection 39, contactor 40, contactor 41, transformer secondary S, conductors 42 and 43, and finally through plug 29 and binding post 5 to ground. The transformer secondary S is the source of power for certain of the tests to be herein described and requires further mention. It has a primary P supplied with pulsating direct current from a battery 44 by way of the make-and-break device 45 commonly termed a "buzzer". This battery circuit may be opened at the end of the day's work by a switch K. Buzzer 45 has a function in addition to that of making and breaking the circuit to primary P. Its vibratory element carries a little hammer 46 which raps on contacts 47 and so makes and breaks the circuit in conductor 48 leading to the telephone receiver T. This telephone forms part of the current detecting means of the apparatus and may be used in conjunction with the galvanometer G, or independently thereof, as occasion may dictate.

Let us next consider the current detecting means in detail. Referring to Fig. 4, it will be seen that the current detecting means there indicated by the letter G, is connected directly across the lines L and L'. Referring to Fig. 3, we can trace this out as follows: Beginning at binding post 8, where the line L enters, and going upward on the first vertical line, namely, 49, and around by way of contactor 50 and contactor 51, we reach conductor 52; but there the path divides into three; one through the receiver T and vibrating contacts 47; a second through key 11 and galvanometer G and its shunt 53; and a third through key 12 and galvanometer G. Each of these three paths has its functions. When making the break-finder test, only the path through the telephone is used. But in many of the other tests and measurements, all three paths can profitably be used, for by making the preliminary and rougher adjustments with the telephone alone in circuit, the operator can work at high speed and is relieved of all the annoyance incident to throwing a galvanometer across a badly unbalanced bridge. After the operator has satisfied himself, by aid of the telephone, that he has worked the system into a very nearly balanced condition, he can then discard the telephone and finish up by aid of the galvanometer G. Key 11 throws the galvanometer in circuit while protected by a shunt resistance 53, though for the final adjustment, key 12 alone can be used, thereby throwing the galvanometer directly across the bridge. It will thus be seen that for the normal or inactive setting of the instrument, the battery b is not supplying current to anything and so can be left permanently connected to the terminals 1 and 2 without danger of deterioration. By having the battery $b$ connected in series with the secondary S of the small transformer, it is possible to throw the various elements of the testing set into the various groupings illustrated by Figs. 4 to 8, inclusive. Without this special relation between battery and transformer, the various groupings could not be effected as herein described.

To change the testing set from the normal setting into the adjustment suitable for resistance measurement, the master key is thrown to spread contactors 38 and 50, all other contactors, plugs and the like, remaining unchanged. This change throws the elements into the relation shown in Fig. 5, which, as will be seen, is the ordinary Wheatstone bridge adjustment. In detail, this change consists in disconnecting the battery B from ground at contactor 38 and connecting it in by way of conductors 55 and 49, to the junction point between the "unknown" line and the adjustable resistance R. Also, the change includes disconnecting the galvanometer circuit at contactor 50 and re-connecting, by way of contact 56, to the junction point 57, where resistance B connects with resistance R. With this setting of the master key, the apparatus has all the functions of a Wheatstone bridge, but with the additional advantage of the telephone receiver T operative independently of the galvanometer to make approximate measurements, and operative in conjunction therewith to increase the speed with which the more accurate measurements can be made.

To change the apparatus into proper adjustment for making the Varley loop test, it is only necessary to throw the master key into the V position. By this movement, contactors 38 and 50 are restored to their normal position and contactors 41 and 51 are spread into their outer positions. This change disconnects battery $b$ at contactor 28 and reconnects it to ground by way of contactor 38, cross-connection 39, contactors 40 and 41, conductors 42 and 43, and plug 29, to ground, as stated. All the other elements of the set remain in the same relation as before, with the galvanometer connected across the bridge made up by resistances A and B as ratio arms and R and the "unknown" as the other arms. This is the setting required for the Varley loop test, the object and nature of which need not here be discussed.

To change the apparatus into adjustment for the Murray loop test, the master key is thrown into the M position, thus restoring contactors 41 and 51 to normal and spreading contactors 40 and 58. This change short circuits resistance B at contactor 58 and again puts battery $b$ to ground by way of contactor 40. For the break-finder test, the master key is thrown into the B. F. position, thus spreading contactors 59 and 60. Contactor 59 serves to short circuit the vibrating contacts 47 leaving the telephone connected directly across the lines L, L', as in the normal setting of the instrument. Contactor 60 serves to short-circuit resistance B. During this test, the transformer secondary S is in circuit and constitutes the effective source of energy. The break-finder test is based on a comparison of the electrostatic capacity of a good line with that of a broken line, the distance to the break being based on calculation from this ratio, in well known manner. These measurements constitute the four basic tests of a telephone system and, as above explained, can be made by this apparatus after it has been thrown into adjustment by the simple operation of throwing the master key into the appropriate position. But in addition to the four basic measurements, there are certain other standard tests possible with this apparatus, provided changes are made in the setting of the plugs shown in Fig. 1. Thus, to measure high insulation resistance (metallic) it is sufficient to set the master key at normal and then change plug 27 to socket 26 and plug 29 to socket 28 and remove plug 23. This throws the elements into the relation shown in Fig. 9, which is the proper relation for making high insulation tests from wire to wire. For low metallic insulation tests it is only necessary to make the additional change of transferring plug 24 to socket 25. This puts a shunt across the galvanometer and additional resistance in series with R as shown in Fig. 10. Under the conditions illustrated by Figs. 9 to 12, inclusive, the buzzer 45 is not in operation.

For making high insulation tests to ground, the setting of plugs shown in Fig. 3 is modified by changing 27 to 26, and removing 23. This gives the relation shown in Fig. 11. For making low insulation resistance measurement to ground, the arrangement of Fig. 11 is altered by shifting plug 24 (Fig. 3), to socket 25, thus putting a 500-ohm resistance in series with the variable resistance of the set, also putting a resistance in shunt to the galvanometer. This relation is shown in Fig. 12.

It will be seen that by the above changes in plugs, the apparatus can be used for the more common resistance measurements, thereby taking the place of both the galvanometer set and the voltmeter ordinarily used by telephone men for this purpose.

To sum up, it may be said that this apparatus embodies all the elements of a Wheatstone bridge, a break-finder set, a voltmeter insulation set, and a galvanometer insulation set, and the elements are so disposed and correlated that the four basic telephone tests can be made without other preliminary adjustment than that of throwing a master key.

What I claim as new and desire to secure by Letters Patent of the United States, is,

1. In a testing set, the combination of two fixed resistances, an adjustable resistance, current detecting means, a battery, line terminals, and a four-way master key normally connecting one end of said battery to ground and also connecting said current detecting means across said line terminals, said key having means for disconnecting said battery from ground and for then establishing a Wheatstone bridge relation between said resistances, battery, and current detector.

2. In a testing set, the combination of two fixed resistances having a junction point, a battery connected to said junction point, current detecting means connected to the other end of one of said resistances, a grounded terminal and two line terminals, an adjustable resistance, and a master key having contactors between said battery and said grounded terminal and between said current detecting means and said adjustable resistance and between said adjustable resistance and one of said fixed resistances.

3. In a testing set, terminals for the unknown resistance, a current detector normally connected across said terminals, two fixed resistances and an adjustable resistance normally forming a closed loop with said current detector, and a master key adapted to shift the connections of battery and current detector and establish the Varley loop relation with the unknown resistance.

4. In a testing set, a battery, a grounded terminal, a fixed resistance normally connected to one end of said battery, an adjustable resistance, two line terminals, a current detector connected across said line terminals and to said fixed resistance, and a master key having contactors between said battery and said grounded terminal and between said current detector and said adjustable resistance and between said adjustable resistance and a battery terminal, substantially as described.

5. In a testing set, the combination of a telephone receiver, a source for supplying current thereto, contacts in the path of said current, means for shunting said contacts at will and a local circuit including a buzzer, said buzzer having means rapidly and periodically closing said contacts to establish unidirectional current pulsations in said telephone receiver.

6. In a testing set, a current detector comprising a galvanometer and a telephone receiver, a source of energy common to both said receiver and said galvanometer, vibrating contacts in circuit with said receiver to render the supplied energy pulsating and means for shunting said contacts at will.

7. In a testing set, the combination of a battery, a buzzer and a transformer primary all connected in series, a ground connection for the secondary of said transformer, two resistances, means for connecting said resistances together, and to said transformer secondary, a telephone receiver connecting the other ends of said resistances, vibratory contacts connected to said telephone receiver, and means for shunting said contacts when said transformer secondary is supplying current to said resistances.

8. In a testing set, the combination of two resistances constituting ratio arms, an adjustable resistance, a current detector, a source of energy, a grounded terminal, and two line terminals for connection to the conductors under test, and means operative by a single key for connecting said elements in the Wheatstone bridge relation, or in the Varley loop relation, or in the Murray loop relation, as desired.

9. In a testing set, the combination of two resistances constituting ratio arms, an adjustable resistance, a current detector, a source of energy, a grounded terminal, and two line terminals for connection to the conductors under test, and means operative by a single key for connecting said elements in the Wheatstone bridge relation, or in the Varley loop relation, or in the Murray loop relation, or in the break-finder relation, as desired.

In witness whereof I have hereunto set my hand this 17th day of April, 1909.

CHARLES A. HOXIE.

Witnesses:
JACOB W. CLUTE,
A. B. MARVIN, Jr.